(12) United States Patent
Ramsdell et al.

(10) Patent No.: US 9,938,084 B2
(45) Date of Patent: Apr. 10, 2018

(54) CONVEYOR WITH NON-STICK SLATS

(71) Applicant: John Bean Technologies Corporation, Chicago, IL (US)

(72) Inventors: Adam Jay Ramsdell, Sandusky, OH (US); Troy Ora Baumgardner, Huron, OH (US); William Douglas Medley, Clyde, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 14/605,855

(22) Filed: Jan. 26, 2015

(65) Prior Publication Data

US 2015/0210476 A1 Jul. 30, 2015

Related U.S. Application Data

(60) Provisional application No. 61/932,080, filed on Jan. 27, 2014.

(51) Int. Cl.
*B65G 17/06* (2006.01)
*B65G 17/42* (2006.01)
*B65G 17/32* (2006.01)

(52) U.S. Cl.
CPC ......... *B65G 17/067* (2013.01); *B65G 17/065* (2013.01); *B65G 17/32* (2013.01); *B65G 17/42* (2013.01)

(58) Field of Classification Search
CPC .................................................... B65G 17/08
USPC ................ 198/848, 849, 698, 822, 823, 850
See application file for complete search history.

(56) References Cited

U.S. PATENT DOCUMENTS

| 3,857,476 | A |   | 12/1974 | Heifetz |             |
|-----------|---|---|---------|---------|-------------|
| 4,369,612 | A | * | 1/1983  | Wight   | A23G 7/0037 |
|           |   |   |         |         | 53/154      |
| 4,995,801 | A | * | 2/1991  | Hehl    | B29C 45/1769|
|           |   |   |         |         | 198/851     |
| 5,377,819 | A | * | 1/1995  | Horton  | B65G 17/08  |
|           |   |   |         |         | 198/850     |
| 6,536,585 | B1| * | 3/2003  | Ammeraal| B65G 17/066 |
|           |   |   |         |         | 198/778     |

(Continued)

FOREIGN PATENT DOCUMENTS

| FR | 1 194 895  A  | 11/1959 |
| FR | 2 711 630  A1 |  5/1995 |
| GB | 1 011 883  A  | 12/1965 |

OTHER PUBLICATIONS

USA Roller Chain and Sprockets website dated 2012, https://web.archive.org/web/20120406133950/http://www.usarollerchain.com/.*

(Continued)

*Primary Examiner* — Gene O Crawford
*Assistant Examiner* — Lester Ill Rushin
(74) *Attorney, Agent, or Firm* — Christensen O'Connor Johnson Kindness PLLC

(57) ABSTRACT

Conveyor 12 includes a belt assembly 14 to which are mounted slat assemblies 16 on which work products are transported. The slat assemblies 16 are composed of transverse slat members 18 which are attached to the underlying belt assembly 14 by clips 20 that encircle portions of the belt as well as encircle portions of the slat members to engage within slots, grooves, bores, or blind bores 134 formed along the length of the slats.

22 Claims, 4 Drawing Sheets

(56) References Cited

U.S. PATENT DOCUMENTS

| | | | | |
|---|---|---|---|---|
| 7,841,462 B2* | 11/2010 | Layne | ................. | B65G 17/063 |
| | | | | 198/778 |
| 8,430,236 B2* | 4/2013 | Krischer | ................ | B65G 17/44 |
| | | | | 198/699.1 |
| 9,278,812 B2* | 3/2016 | Feigner | ................ | B65G 25/065 |

OTHER PUBLICATIONS

International Preliminary Report on Patentability dated Jan. 8, 2016, issued in corresponding International Application No. PCT/US2015/012930, filed Jan. 26, 2015, 23 pages.

International Search Report and Written Opinion dated Apr. 10, 2015, issued in corresponding International Application No. PCT/US2015/012930, filed Jan. 26, 2015, 9 pages.

* cited by examiner

US 9,938,084 B2

CONVEYOR WITH NON-STICK SLATS

CROSS-REFERENCE TO RELATED APPLICATION

This application claims the benefit of U.S. Provisional Application No. 61/932,080, filed Jan. 27, 2014, the disclosure of which is hereby incorporated by reference herein in its entirety.

BACKGROUND

The present invention pertains to food processing systems, and in particular, conveyors for processing food products designed so that the food products do not readily adhere to, or "stick to," the conveyor.

In industrial or commercial food processing systems, food products are carried by conveyors during the processing of the food products, including cooking, such as during frying or baking of the food products. Some food products tend to adhere to the conveyor, for example, coatings and seasoning used on food products, including meat, poultry, fish, vegetables, etc. Such coatings are primarily batter or "tempura" but may also include flour, breading, corn meal, panko, etc. When the food product is removed from the conveyor surface, the coating may be disturbed, causing the food product to be rejected.

To address the foregoing challenges in food processing, conveyors may be constructed with cross slats composed of material that does not readily adhere to, or "stick to," typical food products, including coatings and seasonings. Such cross slats heretofore have been attached to the underlying drive chains or other conveyor components by threaded fasteners to physically connect the slats (and perhaps also carriers with which the slats are engaged) to the drive chain or other underlying structure of the conveyor system. To prevent the fasteners from working loose and unwanted disassembly, the threaded fasteners are welded to the underlying chain or other conveyor structure. This results in the assembly of the conveyor being very labor-intensive, and thus expensive. Moreover, repair of the conveyor is difficult in that it is necessary to cut or otherwise remove the welded fasteners from the chain. The present disclosure seeks to address the foregoing and other shortcomings with respect to current slat-type conveyor construction, as well as address other technical issues.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A conveyor belt assembly composed of links extending along the belt includes slats disposed across the conveyor belt and attachment clips extending from the conveyor belt to encircle at least a portion of the slats, thereby to attach the slats to the conveyor belt.

In a further aspect of the present disclosure, the widths of the slats correspond to the pitch of the belt links, and preferably the slats are narrower than the pitch of the belt links to define a gap between adjacent slats.

In a further aspect of the present disclosure, the slats have portions defining grooves extending into and along the slats for engagement of the attachment clips into the grooves. In this regard, the clips can be generally C-shaped to include flanged end portions that are engageable into the grooves of the slats.

In a further aspect of the present invention, the slats are configured to define a top surface and side surfaces disposed laterally to the top surface. The grooves are formed in the side portions of the slat. The attachment clips are shaped to include free end portions that define flanges that are engageable into the grooves formed in the side portions of the slats.

In accordance with another aspect of the present invention, the slats are composed of a non-slick outer surface.

In accordance with another aspect of the present disclosure, the attachment clips encircle at least a portion of the conveyor belt links and extend from such encircled portion of the conveyor belt links to encircle at least a portion of the slats, thereby to attach the slats to the conveyor belt.

In accordance with a further aspect of the present disclosure, the conveyor belt is composed of sequential links connected by connection rods extending across the belt to interconnect longitudinally adjacent links. The attachment clips encircle one or more of the conveyor belt connection rods and encircle at least a portion of the slats, thereby to attach the slats to the conveyor belt. In a more specific aspect to the present disclosure, the attachment clips encircle a plurality of conveyor belt connection rods.

A slat assembly is mountable on a conveyor belt, the belt having a plurality of supporting elements extending across the belt. The slat assembly includes a plurality of slats extending across the belt, with the slats having a body portion and a load-bearing portion extending along the body portion. A plurality of attachment clips encircle at least a portion of the supporting elements of the conveyor belt and at least partially encircle the body portion of the slats to attach the slats to the conveyor belt.

In accordance with a further aspect of the present disclosure, the slats have portions defining indentations therein. The attachment clips have portions engaged within the indentations of the slats. The indentations can be located in the body portion of the slats. Also, the indentations may be in the form of slots, grooves, bores, or blind bores.

In accordance with a further aspect of the present disclosure, the slat body portions include side surfaces extending laterally from the load-bearing surface of the slats. The indentations are formed in the side surfaces of the body portion. The indentations are in the form of grooves formed in the side surfaces of the slats to receive portions of the attachment clips therein.

In accordance with a further aspect of the present disclosure, the body portion of the slats underlies the load-bearing surface of the slats. The attachment clips partially encircle the underlying body portion.

In accordance with a further aspect of the present disclosure, the support elements of the conveyor belt include a plurality of links extending across the width of the belt. The links are sequentially connected along the length of the conveyor by connecting rods extending transversely to the conveyor and intersecting adjacent links. The attachment clips encircle at least one transverse connecting rod of the conveyor belt and at least partially encircle the body portion of the slats to the conveyor belt.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or a substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to directions, such as "forward," "rearward," "upward," "downward," "extended," "advanced," and "retracted." These references and other similar references in the present application are only to assist in helping describe and understand the present invention and are not intended to limit the present invention to these directions. Also, references to "work product," "workpiece," "food product," "food piece," and "portion" are understood to be interchangeable and are not meant to be limiting in nature.

In the following description, various embodiments of the present disclosure are described. In the following description and in the accompanying drawings, the corresponding systems assemblies, apparatus, and units are identified by the same part number but with an alpha suffix. The descriptions of the parts/components of such systems assemblies, apparatus, and units that are the same or similar are not repeated so as to avoid redundancy in the present application.

Figure 1:
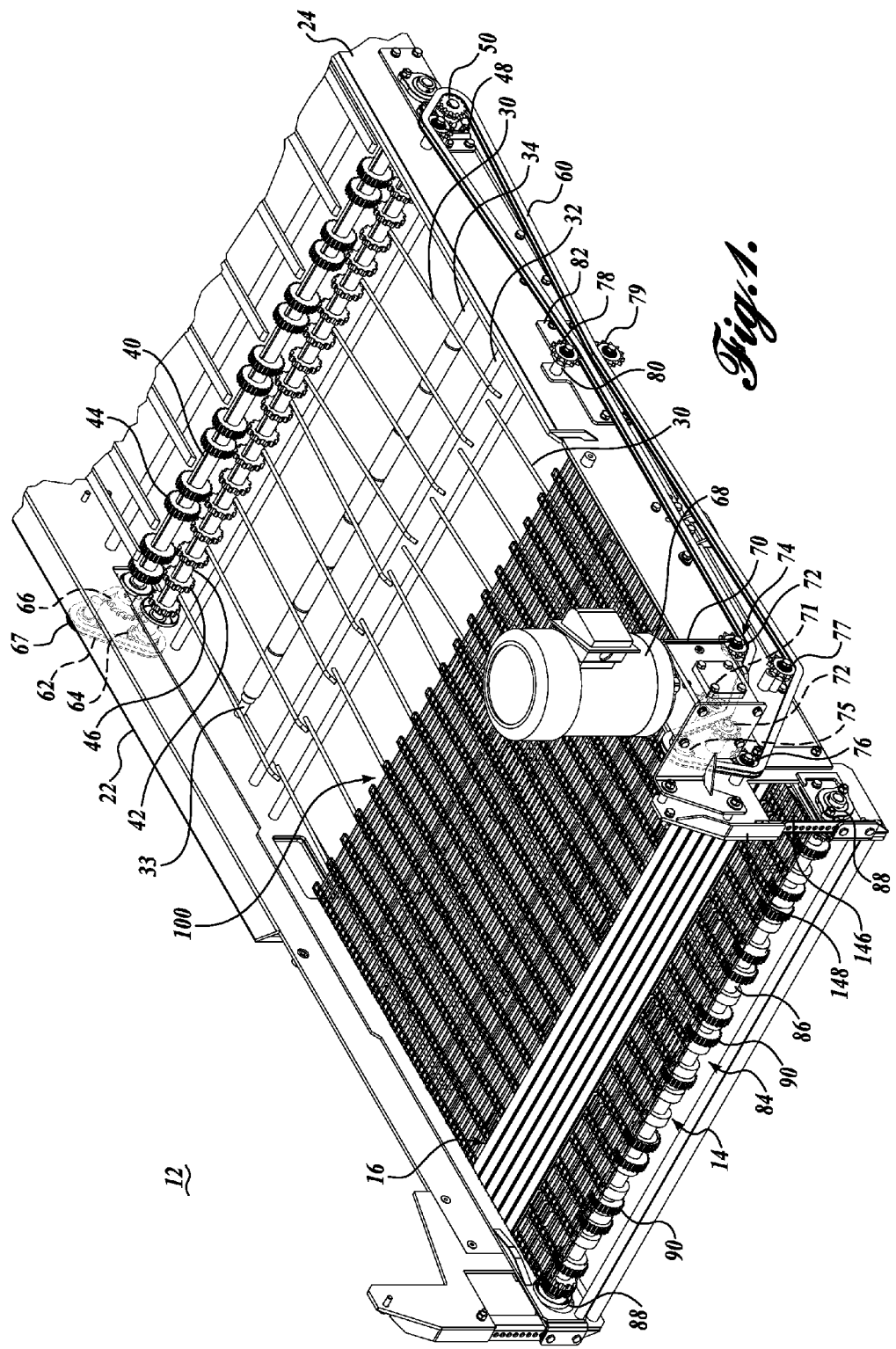
FIG. 1 is a partial isometric view of the present disclosure.
Figure 2:
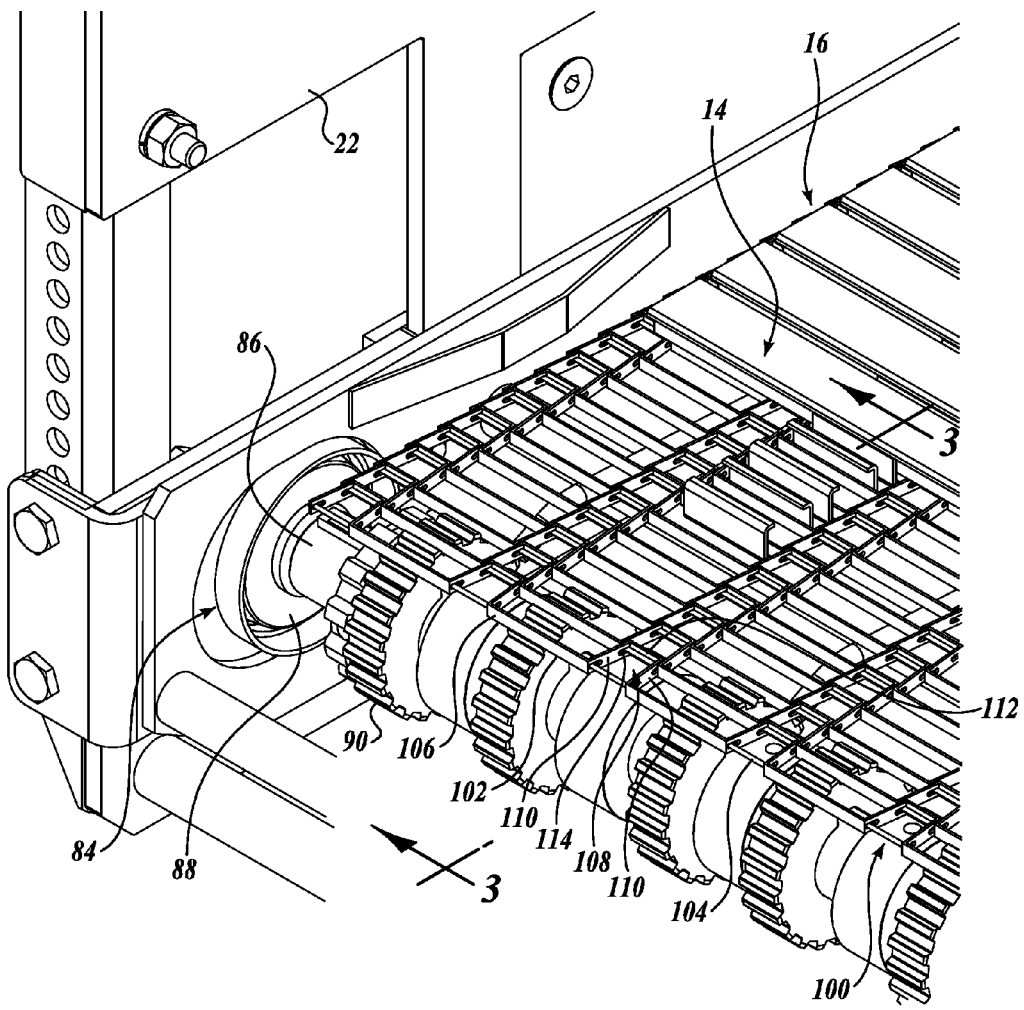
FIG. 2 is an enlarged fragmentary isometric view of the present disclosure.

FIGS. 1 and 2 illustrate a flat wire conveyor 12 which is suitable for effectuating the embodiments of the present disclosure. However, conveyors of other types may also be used in conjunction with the present disclosure. The conveyor 12 is designed to carry food products into fryers, ovens, or other types of processing equipment. The food product is supported on the conveyor 12 as the food product is introduced into the fryer, oven, etc., wherein a separate or different conveying mechanism may be utilized to continue to transport the product throughout the processing station. However, a conveyor similar to conveyor 12 may be utilized to transmit the food product throughout the fryer or other processing stations.

The conveyor 12 includes belt assembly 14 on which is mounted transverse slat assemblies 16 on which the food product is transported. The slat assemblies 16 include transverse slats or slat members 18 which are attached to the belt assembly via connectors in the form of clips 20; see, in addition, FIGS. 3, 4, and 5.

The conveyor 12 includes a frame composed of sidewall structures 22 and 24 extending longitudinally along the sides of the conveyor 12. The top run of the conveyor belt assembly 14 is guided and supported by guide rods 30 extending longitudinally of the conveyor and laterally spaced apart from each other. The guide rods 30 in turn are supported on cross rods 32. The belt returns underneath supported by cross rods 33 over which are journaled roller sections 34. The cross rods 32 and 33 span across the width of the conveyor to be supported by the sidewall structures 22 and 24.

The conveyor belt assembly 14 is powered by a drive system composed of a drive shaft 42 that spans across the conveyor frame to be journaled relative to and supported by the conveyor frame sidewall structures 22 and 24. The drive shaft 42 supports a plurality of drive sprockets spaced apart along the length of the drive shaft. The drive sprocket 44 meshes with the belt assembly 14, thereby to drive the belt assembly. A driven sprocket 50 is attached to the portion of the drive shaft 42 extending laterally outwardly from frame sidewall structure 24 to engage an endless drive chain 60. An idler sprocket 48 is provided to maintain the chain wrap, provide appropriate chain tension, and avoid chain-to-chain collision. The chain 60 is driven by a drive motor 68 via a gear box 70. A drive sprocket 75, powered by the gear box, meshes with the drive chain 60. Also, various idler sprockets 71, 72, 74, 76, and 77 guide the chain 60 towards and away from the powered drive gear 75. A pair of upper and lower idler sprockets 78 and 79 support and constrain the upper and lower runs of the drive chain 60 at a location generally centrally along the upper and lower runs of the belt. The idler sprockets 78 and 79 are antifrictionally journaled on stub shafts 80 extending outwardly from a bracket 82 mounted to the outer side portion of frame sidewall structure 24; see FIG. 1. Although the manner in which the belt assembly 14 can be driven has been described with specificity, it is to be understood that the belt assembly also can be driven by many other systems.

At the entrance end of conveyor 12, the conveyor belt assembly 14 trains around an idler sprocket assembly 84 composed of an idler shaft 86 that spans across the width of the conveyor frame to be supported and journaled by bearing assemblies 88 carried by the conveyor sidewall structures 22 and 24. A plurality of idler sprockets 90 are mounted on the shaft 86 to mesh with the links of the conveyor belt assembly 14, as described more fully below.

The conveyor belt assembly 14 includes a belt 100 composed of formed flat wire links 102 that extend across the width of the belt 100. Adjacent links 102 are connected together by cross rods or cross pins 104.

Each link 102 includes transverse sections 106 divided by formed wedge-shaped segments 108. Each of the wedge-shaped segments includes opposite leg sections 110 extending laterally from transverse sections 106 to intersect an end section 112. The width separating the leg sections 110 is narrower at the end sections 112 than at the intersections of the leg sections with transverse sections 106, thereby forming the generally wedge-shaped segments 108. As shown in FIG. 2, the wedge-shaped segments 108 of the adjacent links 102 nest with each other.

The cross rods 104 extend through slots 114 formed in the leg sections 110 of the wedge-shaped segments 108. A slot 114 is located in the leg section 110 adjacent corresponding end section 112, as well as adjacent corresponding transverse section 106. This enables the cross rod 104 to extend through a slot 114 adjacent transverse section 106 and then through a slot 114 of the next adjacent link 102 located near the end section 112 of such next adjacent link 102. It will be appreciated that the slots 114 can accommodate misalignment between the slots of the adjacent links 102, and can also allow the belt assembly 14 to follow a curved path, if need be.

As shown in FIG. 2, the teeth of idler sprockets 90 mounted on shaft 86 engage with either the transverse sections 106 or the wedge end sections 112 of the belt links 102 to wrap the belt 10 at the end of the conveyor 12. The teeth of the drive sprockets 46 engage the bar links 102 in the same manner as the teeth of idler sprockets 90.

Referring to FIG. 1, the conveyor belt assembly 14 does not extend the full length of the conveyor 12, but rather extends between idler sprocket assembly 84 and drive shaft 42. A second conveyor belt (not shown) that may be of a conventional construction is used to carry the food product further through the processing station. By the time that the food product reaches the second conveyor, the food product has been sufficiently processed that it no longer tends to adhere to the conveyor 14. The second conveyor belt is driven by the drive shaft 40 that extends laterally across the conveyor frame parallel to drive shaft 42. A plurality of sprockets 44 are mounted on the drive shaft 42 to engage the second, perhaps conventional, conveyor belt. The drive shaft 40 is driven by drive shaft 42 via drive chain 62 that engages sprockets 64 and 66 attached to the portions of the drive shafts 42 and 40, respectively, located outwardly of the frame sidewall structure 22. An idler sprocket 67 is positioned between the sprockets 64 and 66.

Figure 3:
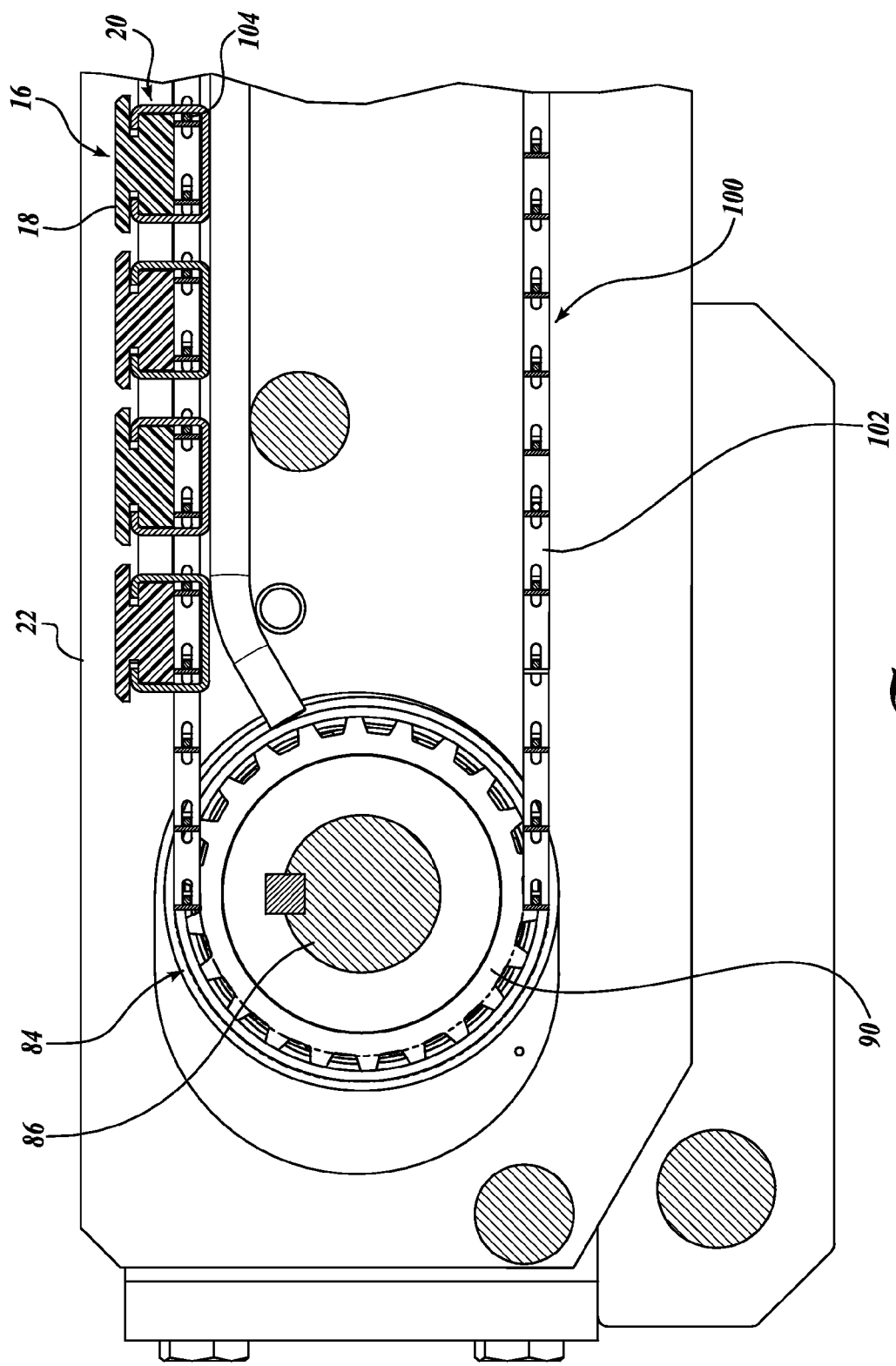
FIG. 3 is an enlarged partial cross-sectional view of the present disclosure taken along lines 3-3 of FIG. 2.
Figure 4:
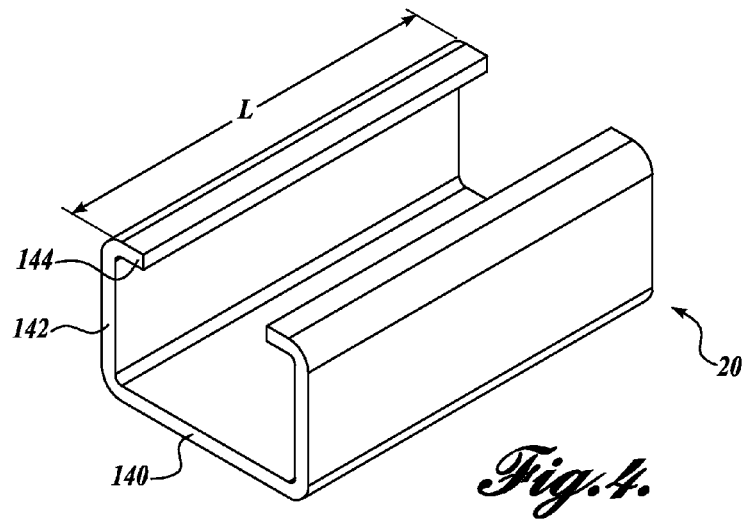
FIG. 4 is an isometric view of a clip of the present disclosure.
Figure 5:
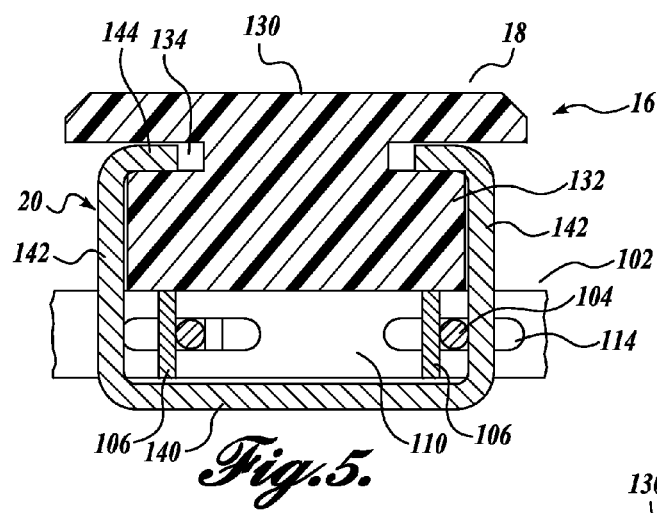
FIG. 5 is an enlarged cross-sectional view of a slat shown attached to a conveyor belt using a clip of the present disclosure.

Next, referring specifically to FIGS. 3, 4, and 5, the slat assemblies 16 include individual slats 18 that are generally rectilinear in cross section. The slats 18 include a top cap portion 130 that overlies a lower body portion 132. Slots 134 are found in the slats 18 to extend laterally into the slat and longitudinally along the slat at a location between the cap portion 130 and body portion 132, at the intersection of the cap portion and body portion. As shown in FIG. 5, the cap portion 130 somewhat overhangs the sides of the body portion 132. Also, the intersection between the top surface of the cap portion 130 and the side edge of such cap portion is beveled or chamfered, which matches historical slat profiles and aids in product release.

The underside of the slat body portion 132 is held against the top edge of the conveyor belt links 102 by attachment clips 20. The clips 20 are generally in the shape of a rectilinear "C." The clips include a base portion 140 that underlies the links 102, upright web sections 142 extending upwardly through links 102, and inwardly directed upper flange portions 144 that are shaped and sized to closely engage into slots 134. The upright web sections 142, by extending upwardly along the sides of the body portion 132 of the slats 18, and the flange portions, by engaging into slots 134, cooperatively, partially surround the body portion 132 of the slat 18. Also, the upright web sections 142 extend beneath and partially around, and thus partially encircle and capture, adjacent cross rods 104 and corresponding transverse sections 106 of belt links 102. In this manner, the clips 20 retain and position the slats 16 relative to a specific belt link 102.

As shown in FIG. 2, the clip 20 encircles two adjacent cross rods 104 and link transverse sections 106. As such, each of the slats 116 corresponds to one pitch of the conveyor belt 100. Also, it will be appreciated that the clips 20 hold the slats 16 securely but not necessarily against the upper edge of the belt links 102. By not holding the slat tightly against the belt link, belt assembly 14 is allowed to articulate more freely around drive and idler sprockets.

As shown in FIGS. 2, 3, and 5, the lengths "L" of clips 20 are selected to almost correspond to the lengths of belt link transverse sections 106. As such, the slats 16 are held substantially stationary relative to the conveyor belt 100 in a direction lengthwise of the slats. Of course, if different types of links are used to construct belt 100, then the length "L" of clips 20 can be adjusted accordingly. Also as shown in FIGS. 1-3, the widths of the slats 16, and in particular the widths of the cap portion 130, are selected so that there is a gap between adjacent slats 16 when mounted on belt 100. This enables food product material to fall down through the slats, for example, breading material that sloughs off food products being processed. Moreover, such gaps enable processing fluids, such as cooking oil, to pass between the slats for circulation relative to the belt 100 and the food products being carried on the belt.

The above description specifies that the clips 20 "extend" upwardly from links 102. Of course, this does not mean that the clips are physically secured to the links, for instance, by weldments.

The slats 16 are preferably formed from material that does not readily adhere to or stick to typical food products, such as coatings used with poultry, meat, fish, vegetables, etc. Such coatings are primarily batter or "tempura" but may also include, for example, breading, corn meal, flour, panko, etc. Materials meeting the foregoing requirements include any of the family of FDA-compliant Polytetrafluoroethylene (PTFE). In this regard, the entire slat 16 can be composed of PTFE material or other suitable durable "non-stick" material, such as Polyether ether ketone (PEEK).

Due to the fairly harsh operating environment of the conveyor 12, it is desirable that the clips 20 be made from a material, and of a thickness, that is structurally capable of securely maintaining the slats attached to the conveyor belt 10, even in high operating temperatures. In this regard, the composition of clip 20 should take into consideration that the thermal expansion coefficient of the slats may differ substantially with respect to the thermal expansion coefficient of clip 20. One suitable material for the clips 20 is stainless steel. Other metallic or non-metallic material may be utilized.

The foregoing construction of clips 20 facilitates the installation of the slats 18 on the conveyor belt 100. In this regard, as shown in FIGS. 1 and 2, the clips 20 may be positioned to span between adjacent transverse sections 106 of adjacent links 102. Then the slats may be installed by sliding the slats laterally relative to the conveyor belt 10 to engage the clip flange sections 144 into the slots 134 formed in the slats 18. Openings 146 are formed in brackets 148 attached to the end portions of the conveyor sidewall structures 22 and 24 through which the slats 18 may be passed during assembly and disassembly from conveyor belt 10. Of course, one or more openings can be formed in other locations along the conveyor sidewall structures 22 and/or 24 for sliding assembly and disassembly of the slats 18 with the clips 20.

Figure 6:
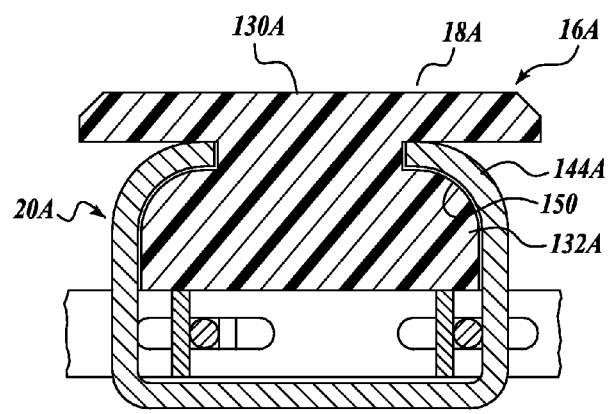
FIG. 6 is a view similar to FIG. 5, showing an alternative embodiment to the present disclosure.

An alternative embodiment to the present disclosure is illustrated in FIG. 6, wherein the corresponding parts of the conveyor belt are given the same numbers as in FIGS. 1-3 and 5 above, and the corresponding parts of the slat and clip are given the same part numbers as in FIGS. 1-5 but with an alpha suffix. As shown in FIG. 6, slat 16A is similar in construction to slat 16 in that the slat 16A includes a cap portion 130A and a body portion 132A. The body portion 132A differs from body portion 132 in that the upper corners of the body portion 132A are rounded or radiused to form a rounded shoulder rather than being of a rather sharp corner in the manner of body portion 132. Consequently, the flange portion 144A of clip 20A is rounded or radiused to correspond to the rounded shoulder 150 of slat 16A. Other than in this regard, the slats 16 and 16A and clips 20 and 20A of FIGS. 5 and 6 are substantially the same and provide substantially the same advantages.

Although clips 20 and 20A have been shown as generally of a rectilinear C-shaped structure, slats similar to slats 16 can be mounted on conveyor belt 100 by other systems. For example, rather than utilizing clips having a length "L" to correspond to the length of belt link transverse sections 106 as shown in FIG. 4, shorter clips may be utilized. Moreover, rather than being of a rectilinear length as shown in FIG. 4, the clips can be made from wire material with the profile shown in FIGS. 5 and 6. In this regard, such wire clips or pins can engage within slots similar to slots 134 formed in the slats 16 and 16A. Alternatively, blind holes can be formed in the slats 16 and 16A to receive the ends of the wire clips/pins.

Although clips 20 and 20A, as well as wire clips/pins, have been described above as being of separate construction from conveyor belt 100, either such clips may be fixedly attached to the conveyor belt or the conveyor belt may be manufactured or constructed with integral clips of the nature described above. Such integral construction of the clips with the conveyor belt may include conveyor belts of a flat wire construction, as described above, or conveyor belts of other constructions.

While illustrative embodiments have been illustrated and described, it will be appreciated that various changes can be made therein without departing from the spirit and scope of the invention. For example, the clips 20 and 20A as well as the pin-type clips disclosed above for attaching the slats 16 to the conveyor belt are described as encircling, and thus capturing, adjacent cross rods 104 and transverse sections 106 of the belt link 102. However, the clips and attachment pins may instead encircle and/or capture other portions of the conveyor belt, especially if the conveyor belt is of a different construction than the belt 100 described above. In this regard, slats 16 may be mounted on the conveyor belt without the need for the use of fasteners, such as screws, rivets, or similar hardware, which make assembly and disassembly of the slats from the conveyor belt cumbersome and very time-consuming.

As a further matter, although the attachment structures 20 and 20A have been designated as "clips," such structures could also be referred to by other designations, such as guides, fasteners, or retainers, without departing from the scope of the present invention.

Also, it will be appreciated that although the slat assemblies and conveyer belts constructed with the disclosed slat assemblies are useful to transport food products that otherwise might adhere to conventional conveyors, it can be appreciated that the disclosed slat assembly, and conveyors composed thereof, can be used with other types of food products or for other purposes than specifically described above, or even used to transport work products other than food products.

In addition, although one construction with conveyor belt 100 has been described above, it is to be understood that the conveyor belt can be of a construction considerably different than described. In this regard, it is desirable that the belt has a continuous pitch. Also, to match existing conveyor belts and so that stock material can be used to construct clips 20 and 20A, it can be helpful if the pitch of the belt links 102 is an even design of 1 inch.

The embodiments of the invention in which an exclusive property or privilege is claimed are defined as follows:

1. A conveyor belt assembly having a belt composed of longitudinal links extending along the belt and crosslinks extending across the belt and spanning between longitudinal links, said conveyor belt assembly comprising:
    slats extending across the conveyor belt, the slats having a load-bearing surface extending along the slats and a body portion extending along and underlying the load-bearing surface;
    attachment clips extending from the conveyor belt to encircle at least a portion of the body portion underlying the load-bearing surface of the slats, thereby to attach the slats to the conveyor belt; and
    wherein the attachment clips extend beneath and encircle at least one conveyor belt cross link and extend from such encircled at least one conveyor belt cross link to encircle at least a portion of the slats, thereby to attach the slats to the conveyor belt.

2. The conveyor belt assembly according to claim 1, wherein the width of the slats corresponds to the pitch of the conveyor belt links.

3. The conveyor belt assembly according to claim 2, wherein the slats are narrower than the pitch of the conveyor belt links to define a gap between adjacent slats.

4. The conveyor belt assembly according to claim 1, wherein said slats have portions defining grooves extending into and along the slats, and the attachment clips are engageable within said grooves.

5. The conveyor belt assembly according to claim 1, wherein the body portion of the slats overlies the conveyor belt links.

6. The conveyor belt assembly according to claim 1, wherein the attachment clips engage the body portion of the slats to permit the slats to shift along their lengths relative to the clips.

7. The conveyor belt assembly according to claim 1, wherein the slats are composed of a non-stick outer surface.

8. A conveyor belt assembly having a conveyor belt composed of links extending along the conveyor belt, said conveyor belt assembly comprising:
    elongated slats extending laterally across substantially the entire width of the conveyor belt, said slats comprising a load-bearing surface;
    a body portion located beneath the load-bearing surface, with the body portion having a bottom facing the conveyor belt and side edges extending along the length of the slats;
    attachment clips being structurally separate from and also extending from the conveyor belt to encircle at least a portion of the bottom of the body portion of the slats at an elevation beneath the load-bearing surface, thereby to attach the slats to the conveyor belt;

wherein said slats have portions defining grooves extending into and along opposite side edges of the slats, and the attachment clips are engageable within said grooves;

wherein the clips comprise opposite end portions that are engageable into the grooves of the slats with the opposite end portions of the clips closely engaging within either of the slat grooves; and wherein the grooves extend along the slats a distance greater than the length of the clips to allow the slats to move along the length of the grooves relative to the clips.

9. The conveyor belt assembly according to claim 8, wherein:

the attachment clips comprise free end portions that are extendable into the grooves of the slats, and the clip free end portions are sized to allow the slats to shift lengthwise of the slats relative to the clips.

10. A conveyor belt assembly having a belt composed of links extending along the belt, said conveyor belt assembly comprising:

slats extending across the conveyor belt, said slats comprising a body portion with the body portion having a bottom facing the belt;

attachment clips extending from the conveyor belt to encircle at least a portion of the bottom of the body portion of the slats, thereby to attach the slats to the conveyor belt;

wherein the conveyor belt comprises sequential longitudinal links extending along the length of the belt, such longitudinal links being connected by connection cross rods extending across the belt to interconnect longitudinally adjacent longitudinal links; and wherein the attachment clips extend beneath and encircle one or more of the conveyor belt connection rods and encircle at least a portion of the slats, thereby to attach the slats to the conveyor belt.

11. The conveyor belt assembly according to claim 10, wherein the attachment clips encircle two adjacent conveyor belt connection rods.

12. A slat assembly mountable on a conveyor belt, wherein the conveyor belt has a plurality of supporting elements extending across the belt, the slat assembly comprising:

a plurality of slats extending across the conveyor belt, said slats comprising a body portion extending along the length of the slats, a load-bearing surface extending along the body portion, the body portion defining a bottom portion beneath the load-bearing surface; and a plurality of attachment clips that extend beneath to encircle at least a portion of at least one supporting element of the conveyor belt and at least partially encircle the bottom portion of the body portion of the slats to attach the slats to the conveyor belt.

13. The slat assembly according to claim 12, wherein the body portion of the slats overlies conveyor belt supporting elements.

14. The slat assembly according to claim 12, wherein the body portion defines grooves extending along the body portion, and the attachment clips have portions engageable within said grooves.

15. A slat assembly mountable on a conveyor belt, wherein the conveyor belt has a plurality of supporting elements extending across the belt, the slat assembly comprising:

a plurality of slats extending across the conveyor belt, said slats having a body portion and a load-bearing surface extending along and above the body portion;

a plurality of attachment clips that extend beneath and encircle at least a portion of at least one supporting element of the conveyor belt and at least partially encircle the body portion of the slats beneath the load-bearing surface to attach the slats to the conveyor belt; and wherein the slats have portions defining indentations therein, and the attachment clips have portions insertable within the indentations of the slats.

16. The slat assembly according to claim 15, wherein the indentations are located in the body portion of the slats.

17. The slat assembly according to claim 15, wherein the indentations are selected from the group consisting of slots, grooves, bores, and blind bores.

18. The slat assembly according to claim 15, wherein the slat body portions include side surfaces extending laterally from the load-bearing surface of the slats, and the indentations are formed in the side surfaces of the body portion.

19. The slat assembly according to claim 18, wherein the indentations comprise grooves formed in the side surfaces of the slats, and the attachment clips comprise portions engageable within said grooves.

20. A slat assembly mountable on a conveyor belt, wherein the conveyor belt has a plurality of supporting elements extending across the belt, the slat assembly comprising:

a plurality of slats extending across the conveyor belt, said slats having a body portion and a load-bearing surface extending above and along the body portion;

a plurality of attachment clips that extend beneath and encircle at least a portion of supporting elements of the conveyor belt and at least partially encircle the body portion of the slats to attach the slats to the conveyor belt;

wherein the supporting elements comprise a plurality of cross links extending across the width of the belt, said links sequentially connected along the length of the conveyor belt by connecting cross rods extending transversely to the conveyor belt and interconnecting adjacent cross links; and wherein the attachment clips encircle at least one transverse connecting cross rod of the conveyor belt and at least partially encircle the body portion of the slats to attach the slats to the conveyor belt.

21. The slat assembly according to claim 20, wherein the attachment clips encircle a plurality of transverse connecting rods of the conveyor belt.

22. The slat assembly according to claim 20, wherein the attachment clips encircle two adjacent transverse connecting rods of the conveyor belt.

* * * * *